2,991,185
YELLOW-GREEN OPTICAL GLASS
John J. Smith and James E. Duncan, Brackenridge, Pa., assignors to Pittsburgh Plate Glass Company, Allegheny County, Pa., a corporation of Pennsylvania
No Drawing. Filed Aug. 8, 1958, Ser. No. 753,870
3 Claims. (Cl. 106—52)

The present invention relates to a yellow-green optical filter glass, and it has particular relation to such a glass which can easily be produced, and reproduced within strict color and transmittance ranges.

Certain yellow-green glasses having carefully controlled transmittance properties are useful as optical filters. The radiant energy transmittance requirements of a particularly useful filter glass are: not more than 2 percent at 440 mmu, 6 to 13 percent at 470 mmu, 33 to 42 percent at 500 mmu, 66 to 72 percent at 540 mmu, 68 to 73 percent at 550 mmu, 66 to 72 percent at 560 mmu, 28 to 36 percent at 620 mmu, and 23 to 31 percent at 650 mmu for a glass thickness of 2 millimeters.

Chromium oxides, usually introduced as dichromates, have been employed in a lime-soda-silica glass to produce a yellow-green glass of the type described. A lime-soda-silica glass has been employed since its melting characteristics and physical properties are quite similar to those of the regular plate glass. This type of glass is conveniently and economically manufactured with existing equipment and by established procedures, and lenses made therefrom possess the good quality and excellent durability of plate glasses.

In order to produce the desired transmittance through the use of chromium ions as the sole active colorants it is necessary to balance the oxidation versus the reduction of these ions. The proper balance between the chromium ion ($Cr^{6+}$), which absorbs strongly at 450 mmu and relatively less at 650 mmu, and the chromium ion ($Cr^{3+}$), which absorbs relatively strongly at 650 mmu, must be maintained during the melting of the glass to obtain the desired transmittance properties in the finished filter lenses.

It has been difficult to accomplish control of the oxidation versus reduction balance, and the transmittance properties of the glass, with the degree of accuracy required. Alterations in the oxidation balance, if large enough to increase the absorption at one end of the visible spectrum also decreases the absorption at the other end. For instance, when a significant reducing action is obtained by adding carbon to the batch formula, a glass containing chromium to the extent of 0.50 percent calculated at $Cr_2O_3$ transmits approximately 19.0 percent of the solar radiant energy at 450 mmu and 23.0 percent at 650 mmu through a 2.0 millimeter thickness. On the other hand, when a significant oxidizing action is obtained through the introduction of an oxidant such as sodium nitrate into the batch, a glass containing the equivalent weight percent of $Cr_2O_3$ transmits less than 1.0 percent of the solar radiant energy at 450 mmu and more than 40 percent at 650 mmu through a 2.0 millimeter thickness. Thus, a glass with transmittances similar to those obtained under reducing conditions are required to satisfy the needed absorption at 650 mmu, and one similar to those obtained under oxidizing conditions for those desired at 450 mmu.

In practice, an approach to the desideratum has been achieved to a degree. A batch formula containing sodium nitrate as an oxidant has been employed. An extraordinarily high refining temperature, 100° F. to 200° F. above normal has been maintained until proof dips show that the time at high temperature has been sufficient to force the necessary proportion of the chromium ions into the lower ($Cr^{3+}$) valence state. However, these extraordinarily high refining temperatures injure and tend to shorten the life of refractories, and the long and uncertain time cycles necessary to accomplish the proper balance are inconvenient and disrupt production schedules.

An object of the present invention is to provide a yellow-green glass whose color and transmittance properties can be accurately controlled and easily duplicated in succeeding melts. A further object of the invention is to provide such a glass without the use of high temperatures or long refining times or other difficult and restricting manufacturing processes.

In accordance with the present invention, it has been found that the desired transmittance properties can be obtained in a glass by introducing into the batch copper oxide along with chromium oxides as the coloring agents, in combination with arsenious oxide and an oxidizing agent such as sodium nitrate. These colorants may be added to a clear base glass and they have been found to be particularly suitable for use with lime-soda-silica glasses.

Glasses which are exemplary of the present invention may be produced from conventional batch ingredients. A suitable batch includes the following ingredients set forth in the table below in parts by weight:

| Ingredient | Batch | Range |
|---|---|---|
| Sand | 1,000 | 1,000 |
| Soda Ash | 312 | 245–355 |
| Limestone | 310 | 300–320 |
| Sodium Nitrate | 50 | 15–125 |
| Saltcake | 15 | 3–20 |
| Arsenious oxide | 7 | 3–20 |
| Potassium dichromate | 17 | 9–25 |
| Copper oxide | 0.75 | 0.3–1.3 |

The amount of copper oxide added to the base has a specific relationship of the effective amount of $Cr_2O_3$ present in the batch to achieve the proper color. It has been found that the $Cr_2O_3$ should be present in about 10 to 15 parts by weight to 1 part by weight of copper oxide.

The amounts of arsenious oxide and the oxidizing agent should also be controlled. It has been found that about 0.17 to 1.2 percent of arsenious oxide and 1 to 7 percent of an oxidizing agent such as $NaNO_3$ by weight of the batch material should be introduced into the batch. The percentage of arsenious oxide and sodium nitrate are calculated on the total weight of the unmelted batch materials taken as 100 percent.

The dichromate in the batch may be introduced as an alkali metal dichromate such as sodium or potassium dichromate. Likewise, the nitrate may be introduced as an alkali metal nitrate such as sodium or potassium nitrate.

The batch materials are thoroughly mixed, and the melting, refining and other processes are carried out by the established procedures customarily used for clear lime-soda-silica glasses of the same general type. Excessive temperatures and long refining cycles are not employed. Various size pots may be employed and the melting temperatures and times will vary according to the amount of glass being formed. The procedures and conditions recited below may be employed to produce from 8 to 10 pounds of glass in a clay pot in a furnace heated by the controlled combustion of natural gas.

The empty pot is preheated in a furnace at a temperature of 2200° F. A portion of the mixed batch is ladled into the preheated pot and the temperature of the furnace is gradually increased. Over a period of 1¼ hours, the remaining portion of the mixed batch is ladled into the pot and the furnace temperature is increased to about 2600° F. The furnace temperature is then gradually increased to about 2650° F. during the next succeeding hour, during which time substantially all of the glass making materials are melted. The furnace temperature is maintained at about 2650° F. for an additional 1¾ hours to permit refining of the glass. The chemical reactions are completed and the glass is homogenized and freed of bubbles during this time. An oxidizing atmosphere is maintained within the furnace during the high temperature melting and refining of the glass.

After the glass is refined, the temperature of the furnace is reduced slowly over a 1½ hour period to about 2150° F. The pot is removed from the furnace and the glass is poured on a metal table. It is rolled with a heavy metal roller into the form of a plate. The plate is placed in a kiln where it is annealed so that it can be cut into pieces suitable for fabrication and tests.

The addition of copper oxide to the glass effects additional absorption at wavelengths above 520 mmu and particularly between 600 and 700 mmu. The proper oxidation balance of the glass during melting and refining to provide the desired transmittance properties in the glass, is achieved by maintaining oxidizing conditions throughout the process. The oxidizing conditions insure maximum absorption at 450 mmu by causing the ions of chromium to be present largely in the higher valence ($Cr^{6+}$) state, and maximum absorption at 650 mmu by causing the copper ions to be present in the divalent ($Cu^{2+}$) state. The presence of the oxidizing agent is necessary to obtain this condition. The addition of the arsenious oxide, which serves as an oxidation buffer, in the amounts set forth above aids in maintaining this condition.

The batches set forth above when melted and formed into glass have the following calculated compositions in percent by weight:

| Component | Composition | Range |
|---|---|---|
| $SiO_2$ | 70.9 | 70.4–71.4 |
| $Na_2O$ | 15.1 | 13.9–15.2 |
| $K_2O$ | 0.3 | 0.1–1.6 |
| CaO | 12.1 | 11.7–12.4 |
| $Na_2SO_4$ | 0.7 | 0.2–1.2 |
| $As_2O_3$ | 0.3 | 0.2–1.0 |
| $Cr_2O_3$ | 0.56 | 0.3–0.9 |
| CuO | 0.045 | 0.02–0.09 |

The amounts of the different components of the glass may vary. The ranges of arsenious oxide, chromic oxide and copper oxide set forth above describe approximate limitations which these variations may take and remain within the purview of the invention. The amounts of arsenious oxide, chromic oxide and copper oxide are required in the relationship set forth above in order to produce the desired transmittance properties. The ratio of chromic oxide to copper oxide in the glass ranges from 10 to 1 to 15 to 1 percent by weight.

The transmittance properties of the specific glass set forth in the tables above are shown in the drawing. The sample measured was 2.11 millimeters in thickness and solar light was used as the illuminant for the transmittance test. The total luminous transmittance was 53.2 percent. The following transmittances were observed over the visible portion of the spectrum at the stated wavelengths.

| Wavelength: | Percent transmittance |
|---|---|
| 400 | 0.0 |
| 420 | 0.0 |
| 440 | 0.7 |
| 460 | 5.9 |
| 480 | 20.2 |
| 500 | 40.2 |
| 520 | 59.0 |
| 540 | 68.3 |
| 560 | 66.7 |
| 580 | 56.6 |
| 600 | 41.6 |
| 620 | 30.9 |
| 640 | 26.2 |
| 660 | 25.0 |
| 680 | 28.2 |
| 700 | 30.5 |
| 720 | 38.1 |
| 740 | 45.5 |
| 750 | 48.6 |

Although the present invention has been described with respect to specific details of certain embodiments thereof, it is not intended that such details act as limitations upon the scope of the invention except insofar as included in the accompanying claims. For example, lime-soda-silica glasses may include magnesium and potassium oxides. Conventional lime-soda-silica glasses usable in combination with the essential colorants of the invention may contain 5 to 15 percent by weight of CaO, 2 to 10 percent by weight of MgO, 10 to 15 percent by weight of $Na_2O$ and 70 to 75 percent by weight of $SiO_2$.

This application is a continuation-in-part of our application Serial No. 541,604, filed October 20, 1955, now abandoned.

We claim:

1. A transparent, yellow-green lime-soda silica glass having a radiant energy transmittance of not more than 2 percent at 440 millimicrons, 6 to 13 percent at 470 millimicrons, 33 to 42 percent at 500 millimicrons, 66 to 72 percent at 540 millimicrons, 68 to 73 percent at 550 millimicrons, 66 to 72 percent at 560 millimicrons, 28 to 36 percent at 620 millimicrons and 23 to 31 percent at 650 millimicrons for a glass thickness of 2 millimeters wherein the color controlling constituents thereof consist of 0.2 to 1 percent by weight of arsenic oxide, chromium oxides equivalent to 0.3 to 0.9 percent by weight of $Cr_2O_3$ and 0.02 to 0.09 percent by weight of copper oxide, the ratio of $Cr_2O_3$ to CuO being between 10 to 1 and 15 to 1.

2. A transparent, yellow-green glass consisting essentially of the following ingredients in percent by weight: 70.4 to 71.4 percent $SiO_2$, 13.9 to 15.2 percent $Na_2O$, 0.1 to 1.6 percent $K_2O$, 11.7 to 12.4 percent CaO, 0.2 to 1.2 percent $Na_2SO_4$, 0.2 to 1.0 percent $As_2O_5$, chromium oxides equivalent to 0.3 to 0.9 percent $Cr_2O_3$ and 0.02 to 0.09 percent CuO, the ratio of $Cr_2O_3$ to CuO being between 10 to 1 and 15 to 1.

3. A batch for preparing a transparent, yellow-green glass consisting essentially of the following ingredients in parts by weight: 1000 parts sand, 245 to 355 parts soda ash, 300 to 320 parts limestone, 15 to 125 parts sodium nitrate, 3 to 20 parts saltcake, 3 to 20 parts arsenious oxide, 9 to 25 parts potassium dichromate and 0.3 to 1.3 parts copper oxide, the ratio of equivalent $Cr_2O_3$ to CuO in the batch being between 10 to 1 and 15 to 1.

References Cited in the file of this patent

UNITED STATES PATENTS

| | | |
|---|---|---|
| 2,303,756 | Nordberg et al. | Dec. 1, 1942 |
| 2,581,440 | Pincus | Jan. 8, 1952 |
| 2,582,453 | Pincus | Jan. 15, 1952 |

(Other references on following page)

UNITED STATES PATENTS 2,582,964    Clark _____ Jan. 22, 1952
2,744,360    Collini _____ May 8, 1956

OTHER REFERENCES

Commoner and Glassworker, October 1, 1898.

The Glass Industry I, May 1936, pages 167–171.
The Glass Industry II, May 1937, pages 167–168.
Phillips Glass, the Miracle Maker, Pitman Pub. Co., 1948, 2nd Edition.